United States Patent [19]

Pannell

[11] 4,241,467
[45] Dec. 30, 1980

[54] METHOD AND SYSTEM FOR TWO-QUEEN OPERATION AND REQUEENING OF HONEY BEE COLONIES

[76] Inventor: Otis R. Pannell, 9023 McNair Dr., Alexandria, Va. 22309

[21] Appl. No.: 53,265
[22] Filed: Jun. 29, 1979
[51] Int. Cl.³ ............................................. A01K 47/00
[52] U.S. Cl. ......................................................... 6/1
[58] Field of Search ...................... 6/1, 2 A, 4 A, 4 B, 6/4 R, 8, 9, 12 M

[56] References Cited

U.S. PATENT DOCUMENTS

| 230,448 | 7/1880 | Truxal | 6/1 |
| 850,176 | 4/1907 | Olmstead | 6/4 R |
| 3,426,374 | 2/1969 | Johne | 6/1 |

FOREIGN PATENT DOCUMENTS 543588  3/1942  United Kingdom ............................ 6/1

OTHER PUBLICATIONS

"Two-Queen Colony System," *Beekeeping in Maryland, Cooperative Extension Service Bulletin* 223, 1977, p. 24.

*Primary Examiner*—Robert Peshock
*Assistant Examiner*—Robert P. Swiatek

[57] ABSTRACT

Method and system for introducing a second queen into an established colony of honey bees for additional buildup of the worker bee force prior to the early honey flow, and for the eventual replacement of the resident queen. The established brood is divided into two divisions and placed in separate brood chambers positioned side by side with the resident queen in one division and an introduced queen in the other division. A hive chamber containing drawn comb or comb foundation is placed over each of the chambers containing brood to provide space for brood expansion. Worker bees can move vertically and diagonally among the hive chambers. The two queen bees can move either vertically or diagonally between two hive chambers in a manner which prevents direct contact between them during the brood buildup.

5 Claims, 8 Drawing Figures

METHOD AND SYSTEM FOR TWO-QUEEN OPERATION AND REQUEENING OF HONEY BEE COLONIES

BACKGROUND OF THE INVENTION

This invention relates to the management of honey bee colonies for high honey yields, and more particularly to a method and system for two-queen operation of honey bee colonies with the eventual replacement of the resident queen by a more desirable queen.

Honey bee colonies are housed in hives which usually contain a plurality of hive chambers stacked vertically. Each hive chamber is essentially a rectangular box, without top or bottom, filled with removable frames within which the colony raises brood and stores pollen and honey. The removable frames provide a means of inspection and manipulation of the colony, and of removal of honey in excess to the colony's needs. The lower most chambers, usually two, are used for raising brood and for storing honey and pollen for the colony's own use, and are known as "brood chambers." The hive chambers above the brood chambers are for the storage of honey which is in excess to the colony's needs and are known as "supers." A queen excluder, which usually is essentially a series of wires mounted parallel at a spacing which will allow the passage of worker bees but prevent the passage of queens which are larger, is usually employed between the upper most brood chamber and the lower most super to prevent brood rearing in the supers. A cover and a bottom board which provides an entrance and exit opening at the bottom of the hive assembly complete the basic hive structure.

Each honey bee colony has a distinctive hive odor by which the colony recognizes its own members and intruder bees. The colony readily admits its own members but intruder bees are usually prevented from entering.

Honey bee colonies during an acitve period normally contain a single queen, worker bees, drones, and brood which is primarily worker bee brood. Two queens in the same colony almost never occur in a typical hive because if they contact each other they will contest for survival until one is destroyed. Depending on the season of the year, queen condition, brood space, colony condition, and other factors, queen brood may be present in preparation for swarming or for the replacement of a failing queen which is known as "supercedure." Modern management methods are designed to prevent natural swarming because the colony is left in a weakened condition after swarming and the swarm may be lost. Often a young, more desirable queen is introduced into an established colony to replace the resident queen before supercedure has started to insure the pedigree and control the temperment of the colony. Requeening as currently practiced requires the removal of the resident queen and gradual introduction of the replacement queen. A gradual introduction of the replacement queen is required for the queen odor and the colony odor to become unitized so that she will be accepted by the colony. This introduction period usually requires about 4 days, which is an interruption in brood rearing since the resident queen must be removed from the colony, and if done prior to a honey flow will result in several thousand fewer worker bees when they are needed most for the honey harvest. For this reason, requeening is often delayed until after the honey flow.

Two-queen operation of a honey bee colony provides a larger worker bee force for the honey flow than is provided by a single queen. The colony is reverted back to single queen operation at the appropriate time after the worker bee force is built up. Two-queen operation as currently practiced is described in the literature: *ABC and XYZ of Bee Culture*, by A. I. Root, copyright 1975, pages 555, 556, and 557; *The Hive And The Honey Bee*, Roy A. Grout, Dedant and Sons, copyright 1963, Fourth Printing 1973, pages 271, 272, and 273; and *Agricultural Handbook Number 335*, U.S. Department of Agriculture, June 1971, pages 27 and 28. As specifically pointed out by the A. I. Root reference and may be implied by the other references, two-queen operation of honey bee colonies as currently practiced may not be practical for commercial operations because of the large amount of labor required to effectively manage the colonies.

The methods for two-queen operation of honey bee colonies described in the references typically involve the division of the colony population and brood into two parts with each division in separate hive chambers for purposes of introduction of the second queen. After the introduction has been accomplished, the brood chambers containing the introduced queen are placed above the brood chambers containing the resident queen and the other division of the colony population and brood. The two divisions are separated by newspapers which the bees tear away and intermingle or by a board with a screened opening to separate the bees but allow the mixing of the characteristic odors of the two divisions so that they will become indistinguishable from each other. If a board with a screened opening is used, it is removed after a certain time has elapsed. The vertical stacking of the brood chambers requires that the upper brood chambers and any supers emplaced be removed for inspection and manipulation of the lower brood chambers. This is a difficult task since the heavy hive chambers are stacked to a height above the effective lifting height of people.

SUMMARY OF THE INVENTION

It is an object of this invention to provide an efficient means of simultaneously requeening established honey bee colonies and operating the colonies as two-queen systems so as to provide larger worker bee forces for the main early honey flow than would be provided by a single queen in each colony. This invention combines the two operations, requeening and two-queen colony operation, into a single procedure which is expected to require substantially less labor than two-queen colony operation as currently practiced. Instead of the vertical stacking of the brood chambers containing the separate queens as currently practiced, this invention provides for side-by-side placement of double brood chambers, which requires less effort for effective management.

Worker bees can travel vertically between either lower brood chamber and the brood chamber immediately above, and they can travel diagonally between a lower brood chamber and the brood chamber above the other lower brood chamber. The movement of the queens is limited to either diagonal movement or vertical movement between brood chambers. This control of the movement of the worker bees and the queens is provided by queen excluders and a beeway-isolator which is an element of this invention.

The beeway-isolator is centered on the adjoining walls of the lower brood chambers, and they cover a portion of each lower brood chamber. When configured for diagonal movement of both worker bees and queens, the beeway-isolator provides for the isolation of the queens from each other and prevents them from contesting for survival, except when one queen is near the position where she was placed in the hive complex, and the other queen has made a complete traverse from the position where she was placed to a position in the hive chamber above the queen that has not moved significantly. If this occurs, the queens can contest for survival through the queen excluder. When the beeway-isolator is configured for the passage of worker bees only, the queens cannot physically contact each other. The beeway-isolator, in addition to providing for passage of the bees, provides for thorough intermixing of the colony odors so that neither division of the colony can develop its individual characteristic odor.

The colony is reverted back to a single queen colony at the appropripate time for the honey harvest by removing the resident queen and stacking the brood chambers in a conventional manner. If desired, the brood chambers may be stacked without removing the resident queen, in which case the two queens will contest for survival and one will be destroyed. Queen excluders are used to prevent the remaining queen from reentering and depositing eggs in any hive chamber to be removed after the brood has emerged.

DESCRIPTION OF THE PREFERRED EMBODIMENTS

Figure 6:
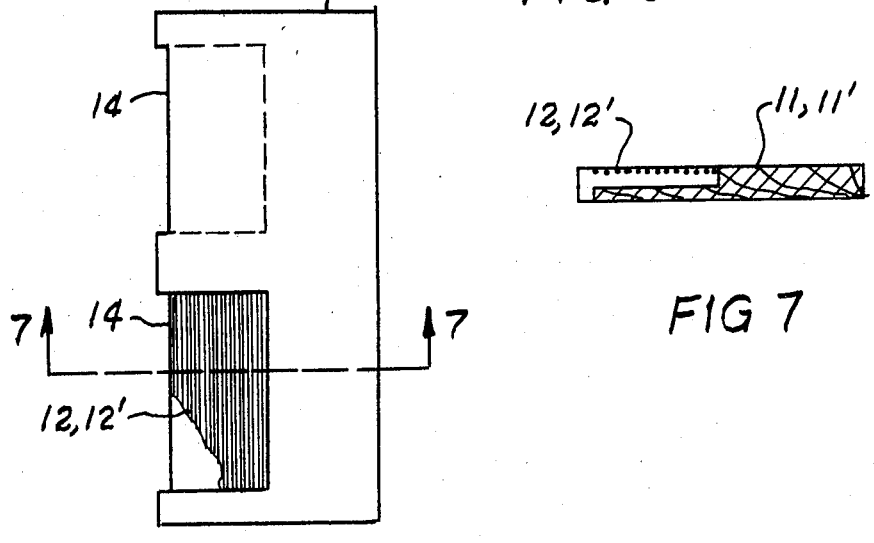
FIG. 6 is a plan view showing one of two identical parts of a beeway-isolator configured for passage of worker bees only.
Figure 7:
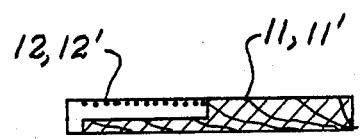
FIG. 7 is a sectional view taken on section line 7—7 of FIG. 6.

The beeway-isolator is comprised of two identical parts. Referring to FIGS. 6 and 7; each of the parts (11 and 11') has a cutout, partway through its thickness, from the top side and from the bottom side. The two cutouts are the same size and extend from a common edge partway across the part. The two cutouts are equally spaced from the transverse centerline of the part so that an identical part positioned with upper cutouts contiguous with lower cutouts will provide a bee passage between lower left and upper right, and between lower right and upper left. A small recess (14) is provided in the edges of the cutouts so that a slight misalignment will not cause a blockage of the bee passages. In the embodiment illustrated by FIGS. 6 and 7, queen excluders (12 and 12') prevent the passage of queens through the bee passages but allow the passage of worker bees. In another embodiment, the queen excluders are omitted to allow passage of queens as well as passage of worker bees. The use of both embodiments is described in this disclosure.

In addition to providing bee passages, the beeway-isolator provides for thorough intermixing of brood chamber odors so that the divisions of a colony cannot develop an individual characteristic odor.

Wood is the preferred basic material of construction for the beeway-isolator and the configurations described are the preferred configurations. However, variations encompassing other configurations and materials may be adapted within the scope of this invention. These variations include, but are not limited to: molded construction, unitized construction wherein both parts are combined into a single unit, using sheet metal to close one side of cutouts which are completely through the part thereby forming the bee passages, and providing a plurality of bee passages in each direction.

Figure 1:
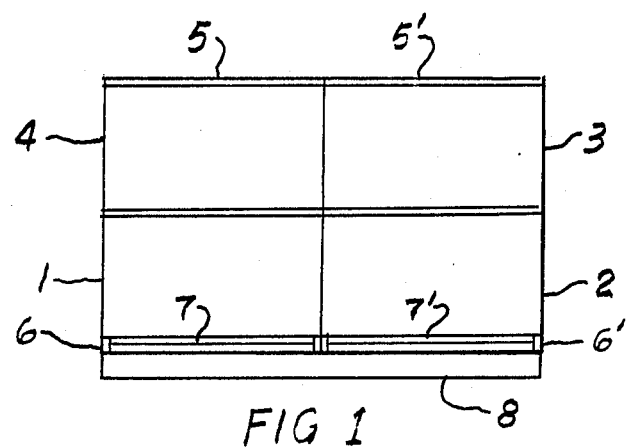
FIG. 1 is a front elevation showing a basic hive complex.
Figure 2:
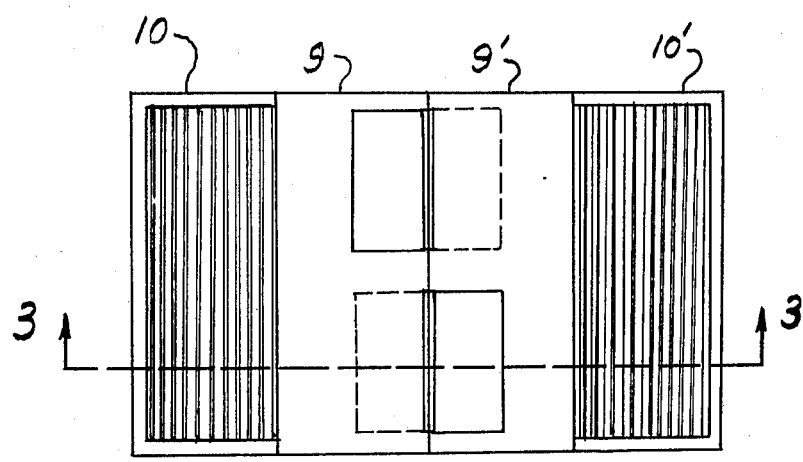
FIG. 2 is a sectional plan view which shows the beeway-isolator and queen excluders which interface between the lower and upper brood chambers, in a configuration which provides for movement of queens and worker bees in a diagonal direction between off-set lower and upper brood chambers and the vertical movement of worker bees between lower and upper brood chambers.
Figure 3:
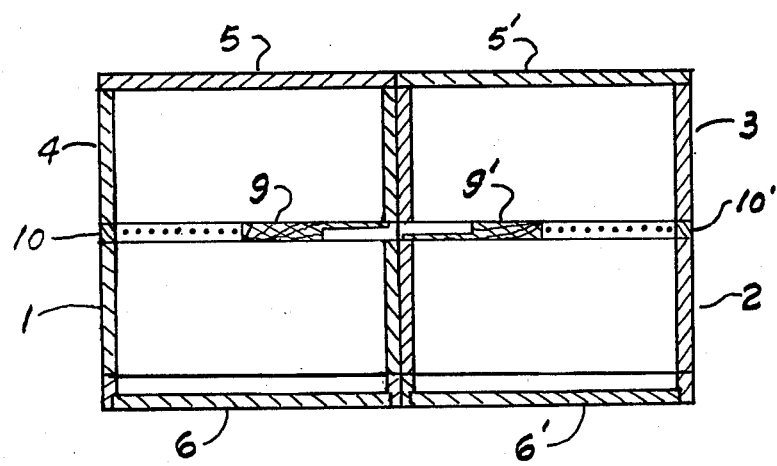
FIG. 3 is a sectional view, taken on section lines 3—3 of FIG. 2 with the upper and lower brood chambers and other structure added to show the relationship of the various elements.

A first embodiment of this invention is illustrated by FIGS. 1, 2, and 3. Referring to FIG. 1, the hive complex comprising four brood chambers (1, 2, 3, and 4), two covers (5 and 5'), and bottom boards (6 and 6') is positioned on a suitable base (8). The bee exit and entrance openings are designated by (7) and (7'). Referring to FIG. 3, this embodiment provides for the movement of a first queen between brood chambers 1 and 3, and the movement of a second queen between brood chambers 2 and 4. A beeway-isolator (9 and 9') which will allow passage of queens and worker bees and queen excluders (10 and 10') are positioned as indicated in FIGS. 2 and 3.

Brood chambers 1 and 2 are typically the brood chambers in which the colony was wintered. Brood chambers 3 and 4 typically contain frames of drawn comb or comb foundation to provide for brood expansion. For purposes of illustration the resident queen is assumed to be placed in brood chamber 1, and the introduced queen in brood chamber 2.

The colony brood frames are divided between brood chambers 1 and 2 with the frames containing the most empty cells placed in brood chamber 1 and the frames containing the most brood placed in brood chamber 2.

Any brood placed in brood chamber 1 should be the oldest or emerging brood and should be placed in the right side of brood chamber 1 as FIG. 3 is viewed. The brood frames containing the younger brood are placed in the right side of brood chamber 2 as FIG. 3 is viewed, and the frames containing the older brood are placed on the left side of brood chamber 2 as FIG. 3 is viewed. Dividing the brood in this manner provides the resident queen a a large complement of empty comb cells so that brood rearing can continue uninterrupted while the new queen is being introduced. By the time that the new queen is introduced and ready to deposit eggs, the older brood will have emerged, or soon will emerge, thereby providing empty comb cells so that she too can deposit eggs.

The resident queen is expected to begin depositing eggs in the vicinity where she is placed and to move across the hive chamber depositing eggs in most combs containing empty cells. Accordingly, the resident queen is placed near the outside edge of brood chamber 1, so that she can move toward the center of the hive complex. Queen excluder 10 will prevent the resident queen from moving into hive chamber 4.

The queen to be introduced is placed in brood chamber 2 between the younger and older brood. Introduction of the queen is accomplished by means of a wood and screen introduction cage. The exit of the cage is plugged with candy which the bees consume in a few days thereby releasing the queen after her odor and the colony odor have fully combined, where upon her release she is usually acceptable to the colony. This method of queen introduction is regularly practiced in the requeening of queenless colonies. Upon the queen's release, she is expected to move toward the center of the hive complex depositing eggs in the vacated comb cells.

Upon arriving at the center of the hive complex, both the resident queen and the introduced queen are expected to pass through the beeway-isolator to the upper brood chambers and continue depositing eggs since there is a natural tendency for queens to expand the brood nest upward.

Figure 4:
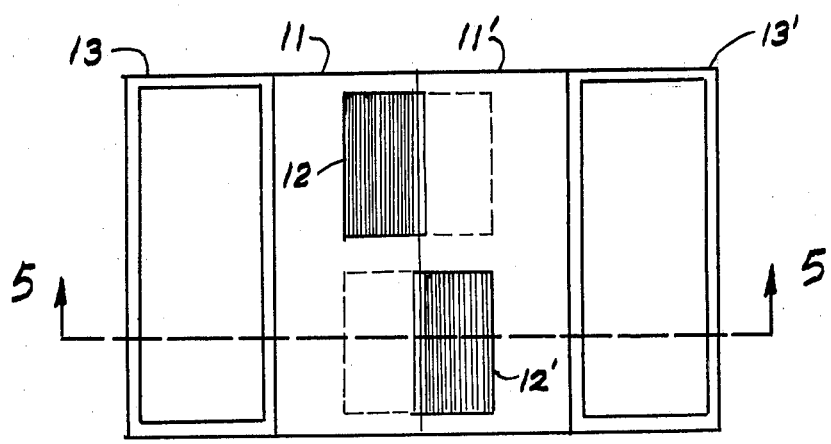
FIG. 4 is a sectional plan view which shows the beeway-isolator and other structure which interface between the lower and upper brood chambers, in a configuration which provides for movement of queen and worker bees between vertically aligned brood chambers and the movement of worker bees in a diagonal direction between off-set lower and upper brood chambers.
Figure 5:
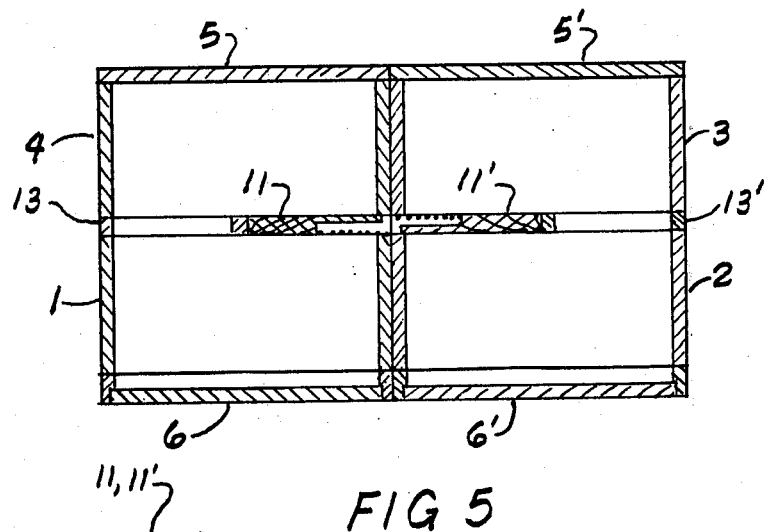
FIG. 5 is a sectional view, taken on section lines 5—5 of FIG. 4, with upper and lower brood chambers and other structure added to show the relationship of the various elements.

A second embodiment of this invention is illustrated by FIGS. 1, 4, and 5. In this second embodiment, worker bees can move vertically between brood chambers and diagonally between offset upper and lower brood chambers as described for the first embodiment. FIG. 1 for this second embodiment is as hereinbefore described for the first embodiment. Referring to FIGS. 4 and 5, a beeway-isolator with queen excluders, as illustrated by FIGS. 6 and 7, covering entrances to the bee passages is emplaced on the adjoining walls of brood chambers 1 and 2. Spacer frames (13 and 13') are emplaced over those portions of brood chambers 1 and 2 that are not covered by the beeway-isolator to provide an uninterrupted surface for emplacement of brood chambers 3 and 4. In this embodiment, one queen can move vertically between brood chambers 1 and 4 through spacer frame 13, and the other queen can move vertically between brood chambers 2 and 3 through spacer frame 13', but neither queen can pass through the beeway-isolator. A primary characteristic of this second embodiment is that the two queens can never contact each other and contest for survival since the nearest that they can get to each other occurs when one queen is at the entrance to a bee passage through the beeway-isolator in a lower brood chamber and the other queen is similarly located in an upper brood chamber.

Referring to FIGS. 4 and 5, the brood combs of a colony are divided between brood chambers 1 and 2 with most of the brood combs containing a large number of empty cells placed in the brood chamber which is to house the resident queen so that she can immediately begin depositing eggs. Assuming that the resident queen will be housed in brood chamber 1, the brood combs containing the most empty cells, and the resident queen are placed in the right side of brood chamber 1 as FIG. 5 is viewed. The resident queen must move across brood chamber 1 from right to left as FIG. 5 is viewed before she can enter an upper brood chamber since she cannot enter the bee passage through the beeway-isolator. The resident queen is expected to deposit eggs as she traverses brood chamber 1 and to enter brood chamber 4 through spacer frame 13 and continue to deposit eggs.

The brood combs containing most of the brood are placed in brood chamber 2, with the younger brood placed next to the right side of the brood chamber as FIG. 5 is viewed; and the emerging and older brood placed next to the left side of the brood chamber as FIG. 5 is viewed. The queen to be introduced is placed in an introduction cage, as herein described for the first embodiment, and positioned at the left side of brood chamber 2 as FIG. 5 is viewed. When she emerges from the introduction cage she can deposit eggs in the comb cells which have been, or soon will be, vacated by the older brood. The introduced queen is expected to move along the brood combs while depositing eggs in the vacated comb cells, and to move to brood chamber 3 through spacer frame 13' and continue to deposit eggs.

Relative to both the first and second embodiments, the colony is reverted back to single queen operation at the appropriate time as determined by the amount of brood that has been produced, and the time of the beginning and the duration of the honey flow. Reverting back to single queen operation can be accomplished by locating both queens, removing the resident queen, and vertically stacking the brood chambers. Both queens must be located since the introduced queen may have been destroyed, in which case the removal of the resident queen would leave the colony queenless.

Finding the queens can be difficult and time consuming because of the large number of bees. A practical method for converting back to single queen operation without the expenditure of a large amount of labor in locating the queens is to stack the brood chambers vertically and allow the queens to contest, in which case one will be destroyed. This method would be exceedingly practical if high honey yields is the primary purpose of the two-queen operation. However, if requeening is a significant factor, the fact that the resident queen may destroy the introduced queen must be considered.

An adequate food supply is essential for extensive brood rearing. Supplemental feeding of pollen supplement or pollen substitute, and honey or sugar syrup should be done if there is any indication of short supply in either lower brood chamber or in the field during the two-queen operation of the colony.

In both the first and second embodiments, if one division of the colony shows significantly more flight activity than the other division, the entrance and exit opening of the division showing the more flight activity can be blocked, except for a small opening next to the center of the hive complex, to divert returning bees into the division showing the lesser activity.

Figure 8:
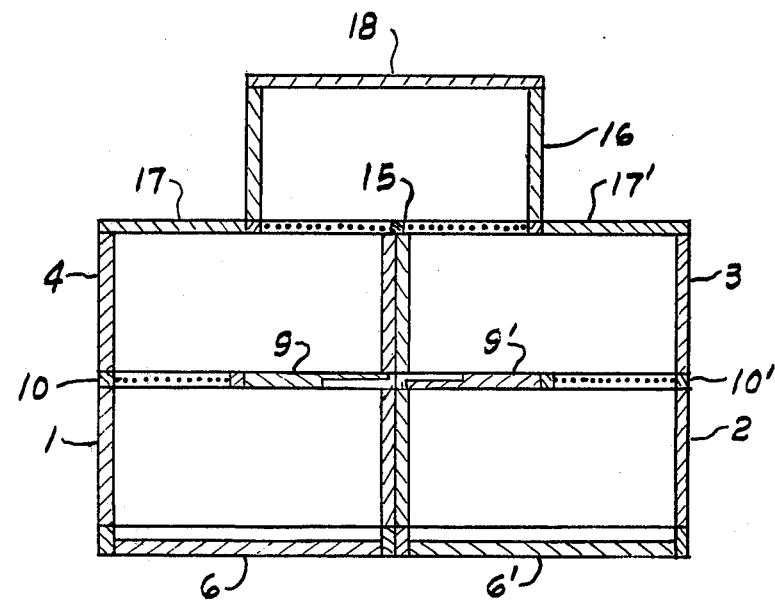
FIG. 8 is a sectional view showing the elements of FIG. 3 with the addition of a super for storage of excess honey during two-queen operation of a colony.

A third embodiment of this invention is illustrated by FIG. 8. In FIG. 8, the basic hive complex comprising four brood chambers (1, 2, 3, and 4), queen excluders (10 and 10'), beeway-isolator (9 and 9'), and bottom boards (6 and 6') are as hereinbefore described for the first embodiment. A queen excluder (15) is placed over adjacent portions of brood chambers 3 and 4. At least one super (16) is placed over queen excluder 15 and a cover (18) is placed over super 16. Since super 16 spans portions of brood chambers 3 and 4, bees from both divisions of the colony can deposit honey in the super. Covers (17 and 17') cover those portions of brood chambers 3 and 4 that are not covered by the super.

This third embodiment provides for the storage of honey to be removed from the colony while two-queen brood rearing is in progress and would have application in those geographical areas where honey flows of long duration occur. The colony is reverted back to single-queen operation, as hereinbefore described for the first and second embodiments, at the appropriate time depending primarily on the duration of the honey flow. This third embodiment can be used with the configuration hereinbefore described for the second embodiment, as well as with the first embodiment.

What is claimed is:

1. A hive complex for two-queen operation of honey bee colonies and the eventual replacement of the resident queen, comprising:
   a. a base;
   b. a first bottom board positioned on said base;
   c. a second bottom board positioned on said base, said second bottom board contiguous to said first bottom board with the hive exit and entrance positions in substantial transverse alignment;
   d. a first hive chamber positioned on said first bottom board;
   e. a second hive chamber positioned on said second bottom board, said second hive chamber being contiguous to and in substantial transverse alignment with said first hive chamber;
   f. a third hive chamber positioned over and in vertical alignment with said second hive chamber;
   g. a fourth hive chamber positioned over and in vertical alignment with said first hive chamber, said fourth hive chamber being contiguous to and in substantial transverse alignment with said third hive chamber;
   h. a beeway-isolator, which provides for queen and worker bee movement between said first and third hive chambers and between said second and fourth hive chambers, positioned on adjacent portions of said first and second hive chambers and providing physical support for adjacent portions of said third and fourth hive chambers;
   i. first and second queen excluders positioned between those portions of said first and fourth hive chambers and between those portions of said second and third hive chambers not occupied by said beeway-isolator; and
   j. a first cover and a second cover closing top openings of said third and fourth hive chambers.

2. A hive complex for two-queen operation of honey bee colonies and the eventual replacement of the resident queen, comprising:
   a. a base;
   b. a first bottom board positioned on said base;
   c. a second bottom board positioned on said base, said second bottom board contiguous to said first bottom board with the hive exit and entrance positions in substantial transverse alignment;
   d. a first hive chamber positioned on said first bottom board;
   e. a second hive chamber positioned on said second bottom board, said second hive chamber being contiguous to and in substantial transverse alignment with said first hive chamber;
   f. a third hive chamber positioned over and in vertical alignment with said second hive chamber;
   g. a fourth hive chamber positioned over and in vertical alignment with said first hive chamber, said fourth hive chamber being contiguous to and in substantial transverse alignment with said third hive chamber;
   h. a beeway-isolator, which provides for worker bee movement between said first and third hive chambers and between said second and fourth hive chambers but prevents such queen movement, positioned on adjacent portions of said first and second hive chambers and providing physical support for adjacent portions of said third and fourth hive chambers;
   i. first and second spacer frames positioned between those portions of said first and fourth hive chambers and between those portions of said second and third hive chambers not occupied by said beeway-isolator, said spacer frames allowing passage of worker bees and queens; and
   j. a first cover and a second cover closing top openings of said third and fourth hive chambers.

3. A hive complex as recited in claim 1 or 2, further comprising:
   l. a third queen excluder covering adjacent portions of said third and fourth hive chambers,
   m. at least one super emplaced on said third queen excluder, and
   n. a third cover on the topmost super.

4. A beeway-isolator, comprising:
   a. a first rectangularly shaped member in plan view with the longer dimension equal to the outside front-to-rear dimension of a hive chamber and the shorter dimension less than the inside width of a hive chamber, said member having at least one recessed space on top and on bottom, said recessed spaces being positioned symetrically about the transverse center line of said member and extending transversely from a common side edge part way towards the opposite side edge; and
   b. a second member, identical to said first rectangularly shaped member, contiguous to said first member in a horizontal plane with said recessed spaces aligned in a manner which provides bee passages between the bottom side of said first member and the top side of said second member, and between the top side of said first member and the bottom side of said second member.

5. A beeway-isolator as recited in claim 4, further comprising:
   c. a queen excluder spanning each said recessed space thereby excluding the entry of queen bees into the beeway-isolator.

* * * * *